Sept. 26, 1967
J. A. NUCKOLLS
3,344,310
UNIVERSAL LAMP CONTROL CIRCUIT WITH
HIGH VOLTAGE PRODUCING MEANS
Filed Jan. 13, 1966
2 Sheets-Sheet 1
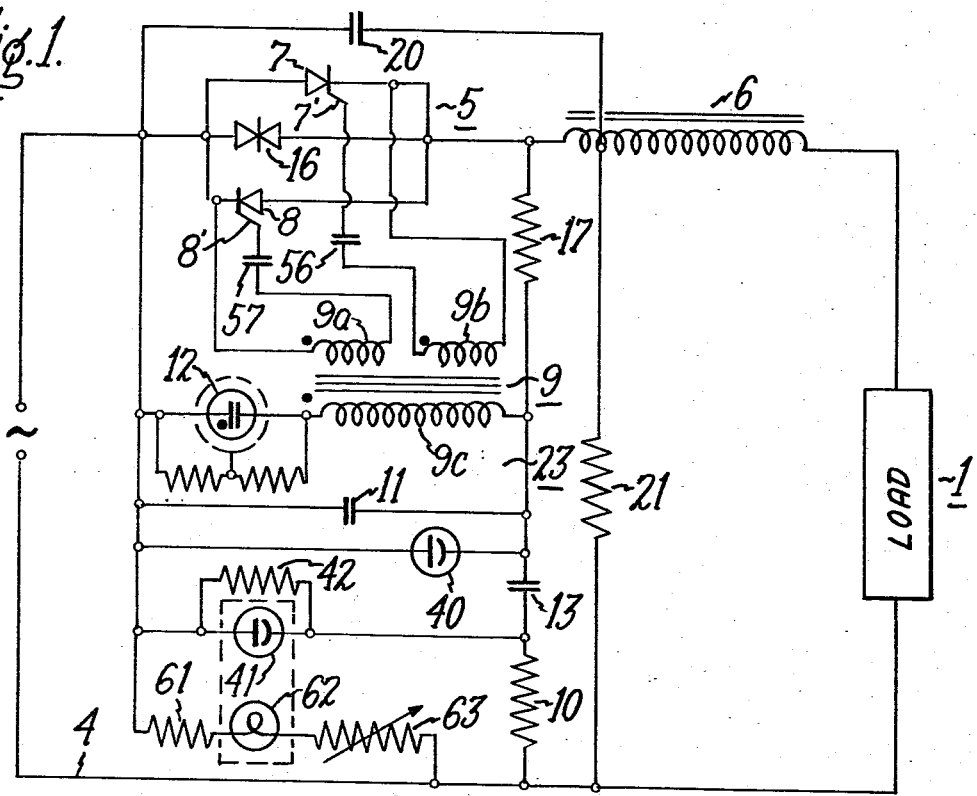
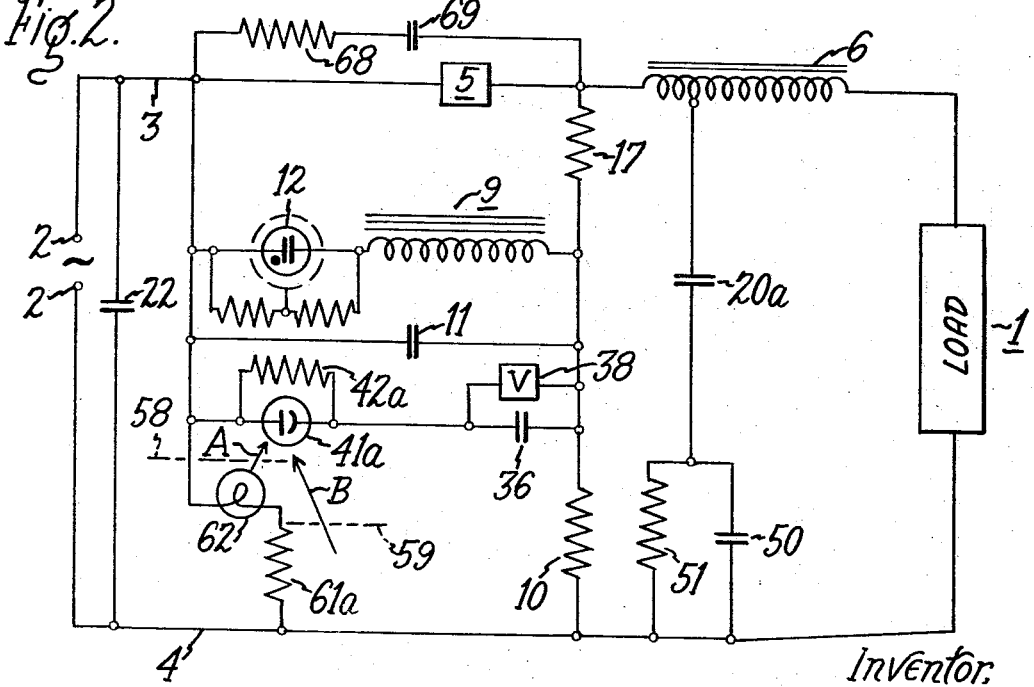
Inventor.
Joe A. Nuckolls,
by Sidney Greenberg
His Attorney.

Sept. 26, 1967

J. A. NUCKOLLS 3,344,310

UNIVERSAL LAMP CONTROL CIRCUIT WITH
HIGH VOLTAGE PRODUCING MEANS

Filed Jan. 13, 1966

Inventor,
Joe A. Nuckolls,
by Sidney Greenberg
His Attorney.

United States Patent Office 3,344,310
Patented Sept. 26, 1967

3,344,310
UNIVERSAL LAMP CONTROL CIRCUIT WITH
HIGH VOLTAGE PRODUCING MEANS
Joe A. Nuckolls, Hendersonville, N.C., assignor to General Electric Company, a corporation of New York
Filed Jan. 13, 1966, Ser. No. 520,487
22 Claims. (Cl. 315—199)

This application is a continuation-in-part of co-pending applications Ser. No. 223,480 filed Sept. 13, 1962, now Patent No. 3,249,807, Ser. No. 451,508 filed Apr. 28, 1965, now Patent No. 3,317,789, Ser. No. 458,353 filed May 24, 1965, and Ser. No. 518,618 filed Jan. 4, 1966, all assigned to the same assignee as the present invention.

The present invention relates to control circuits for operating load devices, and more particularly concerns alternating current, phase controlled circuits which employ controlled rectifier switching means and circuit means for automatically starting, operating, regulating and stopping the operation of load devices, especially gas discharge lamps.

It is an object of the invention to provide an improved control circuit of the above type which is low in cost, simple in construction, and reliable in operation.

It is a particular object of the invention to provide a flexible and versatile control circuit of the above type which is suitable for operating a wide variety of load devices, and particularly various types of lamps including those of gas discharge metal vapor, incandescent, and fluorescent types, which is self-compensating for source voltage variations over a wide range, and which provides easily adjustable load wattage levels.

It is another specific object of the invention to provide a simplified triggering and switching arrangement for load (lamp) control incorporating an alternating current symmetrical switch device with a single control electrode.

It is another object of the invention to provide an improved control circuit of the above type which incorporates high voltage starting means wherein the high voltage generation is de-energized automatically upon ignition of the load device, and wherein the circuit may be employed for starting and operating load devices requiring either high or low voltage for starting.

Other objects and advantages will become apparent from the following description and the appended claims.

With the above objects in view, the present invention in one of its aspects relates to a control circuit comprising a source of alternating current, load means energized by the alternating current source, controlled rectifier means connected between the alternating current source and the load means, the controlled rectifier means being normally nonconductive to block current flow to the load means and having electrode means to render it conductive, actuating means connected to the alternating current source and to the electrode control means for applying a control signal to the electrode control means at a predetermined time in each alternating current half cycle, the actuating means including a capacitance and a first resistance connected together in series, a voltage sensitive switch means connected across the capacitance, and a second resistance connected between the load side of the controlled rectifier means and the junction of the capacitance and the first resistance, and means for providing high frequency, high voltage pulses to the load means including a transformer and a charging capacitance connected to the alternating current source and forming with the controlled rectifier means a pulse-producing discharge loop actuated by the firing of the controlled rectifier means.

In accordance with a particular aspect of the invention, the controlled rectifier means is a single unitary alternating current semiconductor controlled switch having a single control electrode.

The invention will be better understood from the following description taken in conjunction with the accompanying drawings, in which:

FIGURE 1 is a circuit diagram of an embodiment of a control circuit in accordance with the present invention employing switching means comprising a pair of controlled rectifiers;

FIGURE 2 is a circuit diagram of a different embodiment of the control circuit of the invention employing a modified charging circuit and photoelectric control means;

Figure 3:
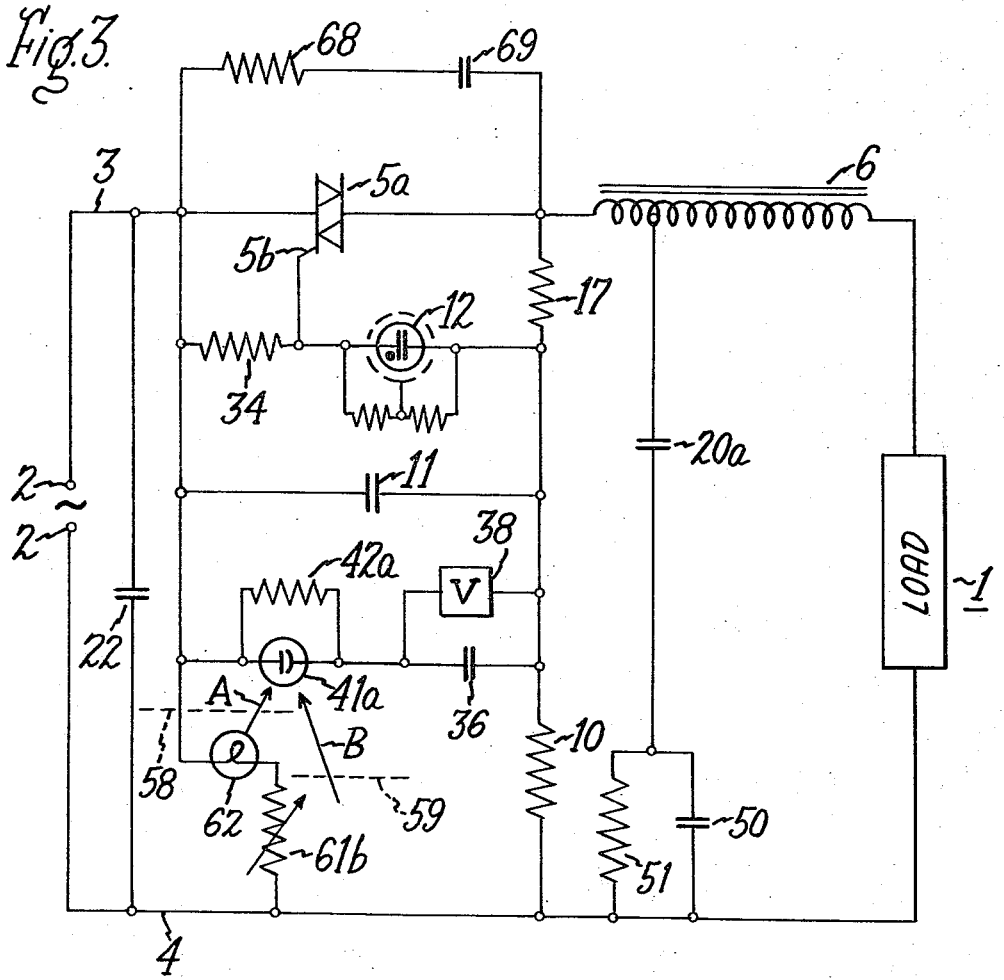
FIGURE 3 is a circuit diagram of still another embodiment of the control circuit of the invention incorporating a modified controlled rectifier switching means.

Referring now to the drawings, and particularly to FIGURE 1, there is shown a phase-controlled switching circuit for controlling the current and voltage applied to a load 1, which may be a gas discharge lamp such as a sodium vapor, mercury vapor, multivapor or other type of lamp, or may be of other forms of variable impedance loads, the load 1 being connected to terminals 2 of a source of alternating current, typically of 220 volts, by conductors 3 and 4. Arranged in series with lamp 1 is a controlled rectifier circuit 5 which includes a paralleled pair of oppositely poled controlled rectifiers 7 and 8, which are typically silicon controlled rectifiers (SCR), having control (gate) electrodes 7' and 8' by means of which the SCR's are rendered conductive for unidirectional flow of current when a signal impulse is applied to the respective control electrodes. For the purpose of protecting rectifier circuit 5 from transient voltages, a thyrector 16, or double Zener diode device may be connected in parallel with the rectifiers, as shown.

Control electrodes 7' and 8' are connected to secondary windings 9a, 9b of pulse transformer 9. Transformer 9, which serves to isolate the controlled rectifier circuit 5 from the impulse signal generating circuit, described below, is a pulse transformer which responds only to high frequency pulses and therefore only a high frequency pulse is applied to controlled rectifier circuit 5. Small capacitors 56, 57 may be placed in series with the SCR control electrodes to avoid undesirable self-triggering in the use of certain types of SCR's.

The signal generating or actuating circuit comprises series connected resistance 10 and charging capacitor 11 connected across terminals 2, thereby synchronizing the signal generating function with the source voltage. A second charging capacitor 13 is placed in series with main charging capacitor 11 and resistance 10. A discharge loop 23 and the actuating circuit for discharging capacitor 11 includes transformer primary 9c and a voltage sensitive device 12, typically a neon glow lamp, which is a bilaterally conducting voltage sensitive switch, and is also referred to herein as a voltage sensitive symmetrical switch means, which becomes conductive only upon application of a predetermined voltage thereon. Glow lamp 12 is connected to the source in parallel with capacitor 11 but is effectively connected in series discharge relation thereto, as shown, and with transformer primary 9c.

In above described circuit arrangement, on each half cycle of the alternating current input, one of the controlled rectifiers 7 and 8 will have a positive anode and the other a positive cathode. Therefore, a control signal applied to control electrodes 7' and 8' will place only one of the controlled rectifiers in a conducting mode on each half cycle. The control of the delay or advance in the time of the alternating current input cycle at which the control signal impulse is applied to render the rectifier conductive, thereby dictating the load power level, is known as phase controlling.

In accordance with the present invention, the switch actuating circuit further comprises a resistance 17 connected between the load side of SCR circuit 5 and the junction of capacitor 11 and resistance 10. Typically, resistance 17 has about half the value of resistance 10. In this arrangement, as more fully explained below, resistance 17 serves both as a component of the actuating circuit which includes capacitor 11 and resistance 10, and as a feedback component for stabilizing the load current similar to the function of the integrating network disclosed in certain of the aforementioned co-pending applications.

A further feature of the present invention comprises a step-up transformer 6 connected in series between SCR circuit 5 and lamp 1, which serves, as more fully explained below, as a combined lamp ballast and high voltage transformer. It thereby combines in a single unit the functions of the separate reactor ballast and high voltage pulse transformer employed in the circuit disclosed in aforementioned co-pending application Serial No. 518,618. Transformer 6 typically is an autotransformer, as shown, with a primary to secondary turns ratio of about 1 to 10.

Connected across SCR switch 5 and the primary of transformer 6 in series therewith is charging capacitor 20, which is connected at the transformer tap to resistance 21, the latter being connected at its other terminal to line conducor 4. Capacitor 20 when charged by the source voltage through 21 prior to the SCR closing serves to provide high frequency energy which is raised by action of transformer 6 to a high voltage, i.e., in the kilovolt range, for starting lamp 1 as the SCR is energized.

In the above descvribed circuit arrangement, the trigger pulse timing and generating circuit comprises capacitor 11 in series with an effective resistance consisting of resistance 17 and resistance 10. This effective resistance operates by resistance 17 being placed in parallel with resistance 10 prior to firing of SCR switch 5 and in parallel with the capacitor 11 branch for the remainder of the current conducting half cycle. This effective combination charging resistance and switching arrangement provides for rapid charging of capacitor 11 to enable SCR switch 5 to be potentially fired early during the half cycle. However, after SCR firing, this arrangement provides a shunting path for capacitor 11 and parallel-connected glow lamp 12, thereby limiting the follow-through 60-cycle current that flows through glow lamp 12.

On any given half cycle in the operation of the described circuit, capacitor 11 charges through resistance 10 and resistance 17 in parallel to a voltage which, in combination with the voltage across resistance 17, reaches the breakdown potential, e.g., 80–90 volts, of glow lamp 12 which then becomes conductive. Capacitor 11 then discharges through glow lamp 12 and a signal pulse is applied to transformer primary 9c which induces a current pulse at a particular time in the half cycle. The controlled rectifier 7 or 8 which has an anode positive with respect to its cathode will then be triggered into conduction by the pulse current to control electrode 7' or 8'. Prior to the turn-on of the SCR on each half cycle, a charge is placed on capacitor 20. When SCR switch 5 becomes conductive, the operation of the discharge loop comprising SCR switch 5, capacitor 20 and the primary of transformer 6 produces high frequency pulses having a voltage which is approximately that of the instantaneous line voltage, these pulses being placed on transformer 6 which then steps up the voltage to a high level, e.g., about 5 kilovolts, for starting lamp 1. At the instant the high voltage appears across transformer 6, capacitor 20 serves to act as a high frequency by-pass forcing this high voltage across lamp load 1.

Once lamp 1 has ignited, the high voltage generating circuit becomes partially de-energized by action of the lamp load impedance becoming low enough to load or dampen the above described high frequency—high voltage switching mechanism. The relative magnitude of the produced high voltage is a function of the instantaneous ionization level of the lamp hence tends to stabilize lamp re-ignition.

Since the combination of lamp 1 and transformer 6 constitutes an inductive load, source current continues to flow after the source voltage reaches zero, and since the trigger actuating circuit is slaved basically to the source voltage, it cannot sense that the collapsing field of the inductor forces continued current flow and, in the absence of resistance 17, would proceed to generate a trigger pulse at an undesirable time, e.g., while load current is still flowing from the last half cycle. However, by the provision of feedback resistance 17, the effective trigger circuit charging resistance is influenced or altered by the instantaneous load conditions. This function of resistance 17 is thus similar to that performed by the integrating network around the reactor as disclosed in the aforementioned co-pending applications Serial No. 458,353 and Serial No. 518,618, and provides for stable lamp load starting and correct wattage buildup even though the lamp impedance changed radically during this period.

Second charging capacitor 13 in the actuating circuit retains after each firing of SCR switch 5 a residual charge which on each half cycle is additive to the voltage appearing across capacitor 11 applied to glow lamp 12, thus providing for advancing the phase angle at which the triggering circuit operates SCR circuit 5, thereby supplying more power to the load, as more fully explained in the aforementioned co-pending applications in which is disclosed a corresponding auxiliary charging capacitor in the actuating circuit. This capacitor is not required for stable circuit operation, however.

The FIGURE 1 circuit also includes a feedback circuit compensating for input voltage variations which comprises photoconductor 41 such as a cadmium sulfide photocell connected across capacitors 11 and 13, and a small incandescent lamp 62 with series resistances 61 and 63 connected across supply lines 3 and 4, incandescent lamp 62 being arranged so that its light is incident on photoconductor 41. In the operation of this feedback system, if the line voltage increases, the current through incandescent lamp 62 increases, brightening lamp 62 and causing photoconductor 41 to decrease in resistance and thereby shunt more of the available charging current away from capacitor 11. This slows the voltage buildup across capacitor 11, thus delaying the firing of SCR circuit 5 and regulating the power delivered to lamp 1. A decrease in line voltage operates conversely to advance the firing of SCR circuit 5 to prevent a decrease in power supplied to lamp 1. Resistance 63, as shown, may be a variable resistor for varying the magnitude of the feedback. Resistance 42 across photoconductor 41 serves to provide a maximum impedance level that photoconductor 41 can offer the charging of capacitor 13. This provides greater stabilization and a limit to the maximum lamp starting current when the circuit is photoelectrically switched externally.

Also shown in the circuit diagram of FIGURE 1 is an auxiliary photoconductor 40 such as a cadmium sulfide photocell connected across capacitor 11 and operating to turn lamp 1 on and off in accordance with ambient light conditions, as more fully disclosed in the aforementioned co-pending applications. Capacitors 56 and 57 are connected in series with the gates 7' and 8' respectively, to stabilize the SCR switching. They serve to limit the otherwise heavy anode-to-gate current flow through the pulse transformer which causes an uncontrolled turn-on as the energy stored in the pulse transformer field turns on the alternate SCR when the conducting SCR snaps off. A small diode can also be used to serve this function.

In an illustrative arrangement as shown in FIGURE 1, the circuit components typically have the following values:

| | |
|---|---|
| Capacitors 56, 57 | 0.1, 12 volts. |
| Capacitor 20 | .15 mfd., 600 volts. |
| Neon glow lamp 12 | NE-83. |
| Capacitor 11 | .012 mfd., 200 volts. |
| Transformer 9 | 4:1:1 turns ratio. |
| Capacitor 13 | .056 mfd., 400 volts. |
| Resistor 10 | 150K ohms, 1 watt. |
| Resistor 17 | 82K ohms, 1 watt. |
| Resistor 61 | 15K ohms, 10 watts. |
| Resistor 63 | 5K ohms. |
| Resistor 21 | 15K ohms. |
| Lamp 62 | 48-D. |
| CdS cell | B 1035. |
| Transformer 6 | 34 ohms, 1:10 turns ratio. |
| Lamp 1 | 400 watts. |

FIGURE 2 shows a modified circuit arrangement in which provision is made for stabilizing the operation of SCR switch 5, and for simplified and stabilized photoelectric feedback control. In this embodiment, a dampening network comprising capacitor 50 in parallel with resistor 51 is connected in series with capacitor 20a between the primary of step-up transformer 6 and line conductor 4. Capacitor 50 in combination with resistor 51 constitutes an RC time constant circuit which prevents an instantaneous voltage reversal across the SCR switch, as explained below. In the FIGURE 2 arrangement, capacitor 20a connected across lamp 1 serves to provide a high frequency path and a 60 cycle impedance, and raises the voltage of the alternating current source to an intermediate level. The dampening network prevents the undesired turn-off of switching circuit 5, which may occur due to the voltage reversal resulting from oscillatory ring-back in the resonant circuit formed by the effective loop capacitance in series with the primary inductance of the transformer 6. The dampening network still allows, however, a closed loop capacitance to ensure application of voltage across the primary of transformer 6. In the operation of this arrangement, when SCR switching circuit 5 is turned on, a closed high-frequency discharge path is formed through the primary of transformer 6, capacitor 20a, and capacitor 50 to effectively press the voltage wave across the transformer primary, but as current flows, a voltage buildup occurs across capacitor 20a in series with capacitor 50, and as the field of the transformer primary collapses, there is generated a higher than instantaneous voltage across series-connected capacitor 20a and capacitor 50, thereby reversing the voltage across SCR circuit 5. This reversal is prevented by the described parallel-connected capacitor 50 and resistor 51 in series with the major discharge loop capacitor 20a. Capacitor 50 provides an instantaneous short-circuit path for the loop and as the voltage buildup across capacitor 50 ensues, the latter is discharged through resistor 51, thereby effecting a decaying voltage to effectively buck the normal short duration voltage reversal while the series capacitor 20a provides the same instantaneous short-circuit upon SCR firing in addition to limiting the high 60-cycle follow-through current.

In the FIGURE 2 circuit, an RC time constant circuit comprising resistor 68 and capacitor 69 is arranged shunting SCR circuit 5. This branch provides instantaneous holding current once the SCR's have been gated, and also provides a leading maximum impedance from source to load side of the trigger circuit which aids in effecting a differential, hence stable, photoelectric switching with slowly changing ambient light levels near the threshold of turn-on and turn-off.

In the circuit shown in FIGURE 2, photoconductor 41a combines the functions of photoconductors 40 and 41 of the FIGURE 1 circuit. Thus, photoconductor 41a is arranged to be exposed to ambient light to effect turn-on and turn-off of the control circuit and lamp 1 in response thereto, while incandescent lamp 62 in the line voltage feedback branch is arranged adjacent photoconductor 41a to compensate for line voltage variations as previously described. Arrow A designates light from incandescent lamp 62 and arrow B designates ambient light, both incident on photoconductor 41a. Adjustment for controlling load wattage may be effected by shade means 58 interposed between incandescent lamp 62 and photoconductor 41a, while the ambient light footcandle level at which the system is turned on and off is achieved by shade means 59 arranged between the ambient light source and photoconductor 41a. Shade means 58 can be an opaque sleeve slidable over incandescent lamp 62, or an adjustable shade, or even a mechanism which controls the distance between photoconductor 41a and incandescent lamp 62. Shade means 59 can be an adjustable shade, an opening of controlled size, or other means for varying the ambient light intensity on photoconductor 41a.

Capacitor 36 in series with photoconductor 41a serves to linearize and stabilize the feedback of this branch over the control range, and can be selected to provide over or under compensation as desired.

A voltage clamping device such as varistor 38 is connected across capacitor 36 to limit and clamp the voltage level of the feedback series network to effect positive photoelectric turn-off action while allowing linear and stable feedback in the control range.

Power factor improvement is provided in the circuit by capacitor 22 connected across the source terminals as shown. A minimum capacitance in capacitor 22 is often required to provide a stiff instantaneous source of current to ensure the voltage ring-up across capacitor 20a, and capacitor 22 should therefore have adequate high frequency capabilities. As will be evident, capacitor 22 is a component of the high frequency discharge loop which includes SCR circuit 5, the primary of transformer 6, capacitor 20a, and capacitor 50.

In a typical circuit, the following components shown in FIGURE 2 have the indicated values:

| | |
|---|---|
| Capacitor 20a | 0.22 mfd., 600 volts. |
| Capacitor 50 | .22 mfd., 200 volts. |
| Resistor 51 | 150 ohms, 2 watts. |
| Capacitor 11 | .022 mfd., 200 volts. |
| Capacitor 69 | .047 mfd., 600 volts. |
| Resistor 68 | 680 ohms, 1 watt. |
| Capacitor 36 | .12 mfd., 200 volts. |
| Resistor 61a | 18K ohms, 10 watts. |
| Capacitor 22 | 0.5 mfd. minimum. |
| Varistor 38 | 30 volts. |

If desired, resistor 61a may be reduced in magnitude and wattage and a capacitor placed in series therewith to bring the total impedance level back to the correct magnitude but limiting the power dissipated in the feedback circuit.

FIGURE 3 shows a modification of the circuit of FIGURE 2 wherein a triac 5a takes the place of the SCR switching circuit. A "triac" is an alternating current semiconductor controlled switch having a single control electrode which, when gated, causes the switch to conduct current in the direction as indicated by the forward bias condition of the semiconductor. A triac may also be described as a bi-directional triode for gate control of alternating current power. This unitary switching device simplifies the triggering arrangement as compared to the previously described SCR switching arrangement wherein a pair of controlled rectifiers with separate control electrodes are employed. In the FIGURE 3 embodiment, triac 5a connected in series between the supply source and transformer 6, and has a control electrode 5b connected to the junction of series connected voltage sensitive switch 12 and resistor 34. At its voltage breakdown level, glow lamp 12 becomes conductive as previously described, and provides a discharge path for capacitor 11 through resistor 34, thereby gating triac 5a through its control electrode (gate) 5b. Resistor 34 primarily serves to reduce the instantaneous voltage impressed on control electrode 5b of the triac, and typically has a value of 220 ohms.

The remaining components and operation of the FIGURE 3 circuit are essentially the same as those of the FIGURE 2 circuit.

Resistor 61b may be a variable resistance as shown for the purpose of adjusting the magnitude of the feedback concerned. A shunting variable resistance may be placed across lamp 62 to provide feedback slope or sensitivity control in conjunction with resistor 61b.

Figure 3A:
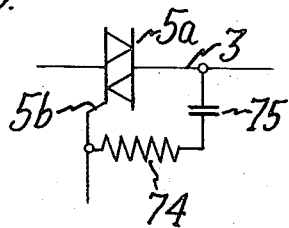
FIGURE 3a shows a modification in a portion of the FIGURE 3 circuit.

The modification shown in FIGURE 3a may be utilized in the event additional gating energy is required for the triac in the FIG. 3 circuit. This modification comprises an RC network constituted by resistor 74 in series with capacitor 75 connected across triac 5a between gate electrode 5b and line conductor 3. In a circuit such as that of FIGURE 3, resistor 74 would typically be 1,000 ohms and capacitor 75 would be .005 mfd. Prior to the triac turn-on, capacitor 75 is charged to the instantaneous line voltage until the triac is turned on, at which time capacitor 75 is discharged through current limiting resistor 74 to supply gate current as the voltage across the triac collapses.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A control circuit comprising, in combination, a source of alternating current, load means energized by the alternating current source, controlled rectifier means connected between said alternating current source and said load means, said controlled rectifier means being normally non-conductive to block current flow to the load means and having electrode control means to render it conductive, actuating means connected to said alternating current source and to said electrode control means for applying a control signal to said electrode control means at a predetermined time in each alternating current cycle, said actuating means including a capacitance and first resistance connected together in series, voltage sensitive switch means connected across said capacitance, and a second resistance connected between the load side of said controlled rectifier means and the junction of said capacitance and said first resistance, and means connected with said controlled rectifier means and said load means for providing a high voltage starting pulse on said load means.

2. A control circuit as defined in claim 1, said high voltage starting pulse means comprising charging capacitance means connected to said alternating current source for charging thereby to a voltage, and transformer means connected between said controlled rectifier means and said load means and to said charging capacitance means for raising said voltage to a higher voltage.

3. A control circuit as defined in claim 2, wherein said transformer means has primary and secondary windings, said charging capacitance means being connected to said primary winding thereof and forming therewith and with said controlled rectifier means a pulse-producing discharge loop actuated by firing of said controlled rectifier means.

4. A control circuit as defined in claim 3, said charging capacitance means being connected across said controlled rectifier means, and a resistance connected across said alternating current source and to said charging capacitance means and forming therewith a charging circuit.

5. A control circuit as defined in claim 1, said actuating means further including an auxiliary capacitor connected in series with said capacitance.

6. A control circuit as defined in claim 1, wherein said load means is connected by a pair of line conductors to said alternating current source, said capacitance and said first resistance being connected in series between said line conductors, and an auxiliary capacitor being connected in series between said capacitance and said first resistance.

7. A control circuit as defined in claim 3, said charging capacitance being connected across said alternating current source.

8. A control circuit as defined in claim 7, including dampening impedance means connected in series with said charging capacitance means for stabilizing the operation of said controlled rectifier means.

9. A control circuit as defined in claim 8, said dampening impedance means comprising a resistor and a capacitor connected in parallel and constituting an RC time constant circuit.

10. A control circuit as defined in claim 9, including a power factor capacitor connected across said alternating current source and forming a part of said pulse-producing discharge loop.

11. A control circuit as defined in claim 2, including feedback means comprising photosensitive means connected to said actuating means for controlling the operation thereof in response to load operating conditions.

12. A control circuit as defined in claim 11, said feedback means further comprising light producing means connected to said alternating current source and varying in light output in response to voltage variations in said alternating current source, said photosensitive means being responsive to said light producing means for controlling the operation of said actuating means in accordance with the light output of said light producing means.

13. A control circuit as defined in claim 12, said photosensitive means being arranged to have incident thereon both ambient light and light from said light producing means for controlling said actuating means, and thereby said load means, in accordance with both light sources.

14. A control circuit as defined in claim 13, including means for selectively controlling the intensity of light incident on said photosensitive means from each said light source.

15. A control circuit as defined in claim 11, wherein a series connected RC time constant circuit is connected across said controlled retifier means.

16. A control circuit as defined in claim 1, wherein said controlled rectifier means comprises a pair of controlled rectifiers connected in parallel and arranged for circuit flow in opposite directions when conducting and each having a control electrode.

17. A control circuit as defined in claim 1, wherein said controlled rectifier means comprises a triac having a single control means.

18. A control circuit as defined in claim 17, said single control means comprising an electrode connected to said voltage sensitive switch means.

19. A control circuit as defined in claim 18, wherein said actuating means includes a resistor in series with said voltage sensitive switch means.

20. A circuit for controlling energization of a load from an alternating current supply comprising, in combination, controlled rectifier means comprising a triac electrically connected between the load and the alternating current supply, said triac being non-conductive to block current flow to the load and having a single control electrode to render it conductive, and actuating means for applying a control signal to said control electrode to render said triac conductive, said actuating means including a resistance and a capacitance electrically connected together in series and to the alternating current supply, a voltage sensitive switch means connected across said capacitance and in series with said resistance, and connected to said control electrode, so that the resistance-capacitance circuit determines the time in each alternating current cycle at which said voltage sensitive switch becomes conductive and a control signal is applied to said control electrode.

21. A circuit as defined in claim 20, wherein a second resistance is connected between the load side of said triac and the junction of said capacitance and said first mentioned resistance.

22. A circuit as defined in claim 20, wherein an RC circuit is connected to said control electrode and across said triac for providing additional gating energy to said triac.

References Cited

UNITED STATES PATENTS

| 3,188,487 | 6/1965 | Hutson | 307—88.5 |
| 3,188,490 | 6/1965 | Hoff et al. | 307—88.5 |
| 3,189,747 | 6/1965 | Hoff | 307—88.5 |
| 3,196,329 | 7/1965 | Cook et al. | 307—88.5 X |
| 3,205,404 | 9/1965 | Kuarate et al. | 315—199 X |
| 3,235,769 | 2/1966 | Wattenbach | 307—88.5 |

JOHN W. HUCKERT, *Primary Examiner.*

R. F. POLISSACK, *Assistant Examiner.*